United States Patent [19]

Hartmann et al.

[11] Patent Number: 4,992,872
[45] Date of Patent: Feb. 12, 1991

[54] METHOD OF SYNCHRONIZING THE HORIZONTAL DEFLECTION OF ELECTRON BEAMS IN TELEVISION RECEIVERS

[75] Inventors: Uwe Hartmann, Villingen-Schwenningen; Udo Mai, VS-Tannheim; Fritz Ohnemus, Villingen-Schwenningen, all of Fed. Rep. of Germany

[73] Assignee: Deutsche Thomson-Brandt GmbH, Villingen-Schwenningen, Fed. Rep. of Germany

[21] Appl. No.: 162,293

[22] Filed: Feb. 19, 1988

Related U.S. Application Data

[63] Continuation-in-part of Ser. No. 910,226, Jun. 23, 1986, abandoned.

[30] Foreign Application Priority Data

Oct. 19, 1984 [DE] Fed. Rep. of Germany ....... 3438366

Oct. 9, 1985 [WO] PCT Int'l Appl ........PCT EP85/00525

[51] Int. Cl.$^5$ .......................... H04N 7/09; H04N 3/24
[52] U.S. Cl. .................................... 358/148; 358/142; 358/165; 358/147
[58] Field of Search ............... 358/148, 149, 190, 165, 358/142, 188

[56] References Cited

U.S. PATENT DOCUMENTS

| | | | |
|---|---|---|---|
| 3,681,522 | 8/1972 | Tanabe | 358/148 |
| 4,396,873 | 8/1983 | Fernsler | 358/190 |
| 4,611,227 | 9/1986 | Brockhurst et al. | 358/142 |
| 4,774,439 | 9/1988 | Butterfield | 358/190 |
| 4,849,818 | 7/1989 | Hartman et al. | 358/142 |

Primary Examiner—Tommy P. Chin
Attorney, Agent, or Firm—Max Fogiel

[57] ABSTRACT

A process for synchronizing horizontal deflection of electron beams in television recievers having a reproduced picture with a visible component, when no transmission signals from a television transmitter are present. If an emitted signal is not available, the synchronization is suspended during the time of the visible picture trace, and is activated only during the picture blanking time. For this purpose, the procedure is to switch off a circuit that synchronizes horizontal deflection during the visible component of the reproduced picture. A synchronization circuit is activated only while the picture is being blanked.

7 Claims, 2 Drawing Sheets

METHOD OF SYNCHRONIZING THE HORIZONTAL DEFLECTION OF ELECTRON BEAMS IN TELEVISION RECEIVERS

BACKGROUND OF THE INVENTION

The present application is a continuation in part of the parent application Ser. No. 910,226 filed June 23, 1986 now abandoned.

The invention employs as a point of departure a method of synchronizing the horizontal deflection of electron beams in television receivers.

When a television receiver is in particular operated in connection with devices for superimposing alphanumeric characters on the screen, synchronization problems occur in that the deflection generators in the receiver, which are controlled by the transmitter, must be precisely matched in sequence with the readout generator for the character memory. This is especially critical when there is no transmission signal because the deflection generators are modulated by noise both in frequency and in phase. Since, however, the character-readout generator follows a fixed and previously determined raster in its frequency, synchronization problems occur in that the characters jitter horizontally in relation to the unsynchronized background of a noisy picture, to the great detriment of the legibility of the characters.

SUMMARY OF THE INVENTION

The object of the invention is to prevent the characters from jittering even when there is no transmission signal. This object is attained in accordance with the invention recited in the claim.

The method being applied for prevents the horizontal-deflection generator in the television receiver from being disturbed during the visible component of the reproduced picture by noise as the result of the lack of a transmission signal and ensures that it will oscillate stably although freely. The result is a definite relation between the frequency of the deflection generator and that of the readout generator The method of the present invention serves for synchronization of the line deflection of electron beams in the picture tube of a television receiver, so as to provide stabilization, particularly when alphanumeric characters are to be superimposed in the television picture. This is the case, for example, when reproducing video text signals of a television transmitter. These video text signals consist of digital signals which are transmitted during the vertical-flyback, i.e., in the invisible part of the television signal. The television receiver which is to reproduce such signals on the video screen as visible text signals, possesses a decoder which detects these video text signals and reproduces them as characters on the video screen in conjunction with a character generator. In reproducing such characters, a very stable synchronization of the line deflection is necessary since the characters jitter otherwise and become thereby difficult to read. The deflection generators in the television receiver which are synchronized by the transmitter must therefore be precisely in tune with the read out generator which reads out the line storage or memory. Noise components can affect disadvantageously the deflection in phase as well as in frequency. When no television transmission signal with its synchronizing pulses are received, because it is switched off, for example, the deflection must be tuned to the read out generator. It is possible, for example, during so-called "after-hour operation" to access video text signals that are stored in a picture storage when it is desired, for example, to view the weather report which was stored in a storage or memory during transmitter operation for later access. For this reason, there is noted in the application that a fixed relationship, i.e., a stable relationship between the frequency of the deflection generator and that of the read-out generator is guaranteed in accordance with the method of the present invention.

Since the receiver can be synchronized by a transmission signal while the picture is being blanked, which takes about 21 lines, it is always possible to switch over to and remain at transmission synchronization while the signal is intermittently present. The resulting window of synchronization that occurs while the picture is being blanked will ensure that synchronization occurs directly at the transmitter when a transmission signal and the alphanumeric characters are being simultaneously reproduced.

Thus, when transmission signals are absent, the synchronization circuit is taken out of operation during the picture run, and the deflection generators swing freely to a fixed frequency. The synchronization is activated only during the invisible part, i.e., during the picture flyback. During this time, accordingly, viewing is done through the so called synchronizing window, to see if synchronizing pulses are eventually transmitted by a transmitter, so that these synchronizing pulses can then take over the synchronization of the deflection. As a result of this method, there is achieved that no noise effects or disturbances can influence the synchronization when transmission signals are absent during the visible component.

A logical "AND" relation between the vertical-flyback signal and the muting-control signal (MUTE), for example, can be employed as a criterion for switching the synchronization. By fulfilling the logical "AND condition", the switching of the synchronization takes place only when vertical flyback signals and the MUTE signals are present.

The receiver synchronization can be switched off, for example, by interrupting the signal path to the amplitude separator. It can also be switched off by discontinuing the synchronization phase comparison or by essentially increasing the phase-comparison time constant. Thus, the switching of the synchronization can be achieved in a number of different ways. For example, this can be achieved in one method by interrupting the signal path to the amplitude separator. With that step, no synchronizing pulses can reach the deflection circuit of the television receiver. At the same time the phase comparison between the synchronizing pulses and the transmission signals of the deflection generators can also be interrupted. It is also possible, on the other hand to increase the time constants of the phase comparison, to an extent that the phase comparison is taken out of operation.

DESCRIPTION OF THE PREFERRED EMBODIMENT

Figure 1:
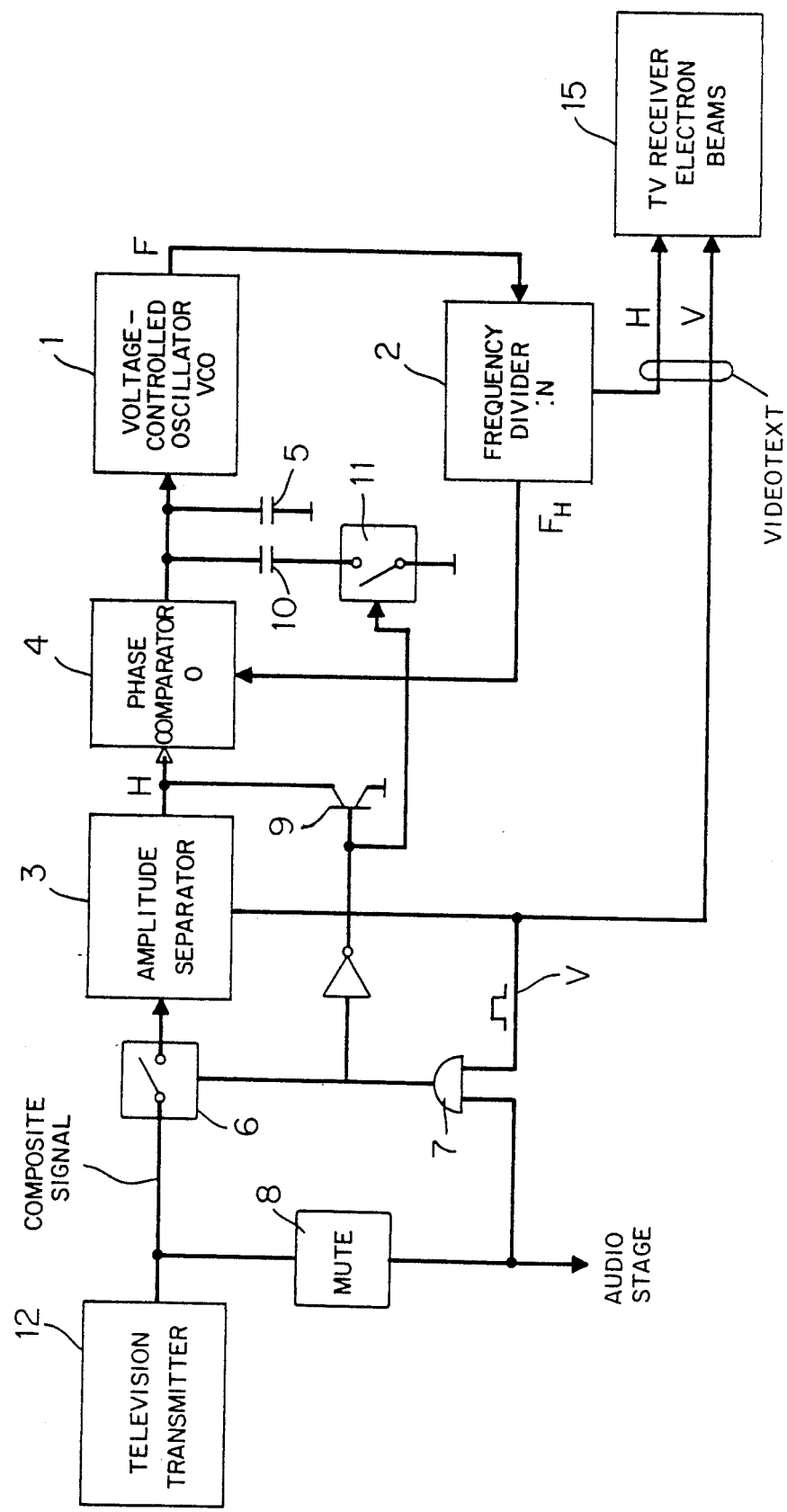
FIG. 1 is a schematic diagram showing the arrangement in accordance with the present invention.
Figure 2:
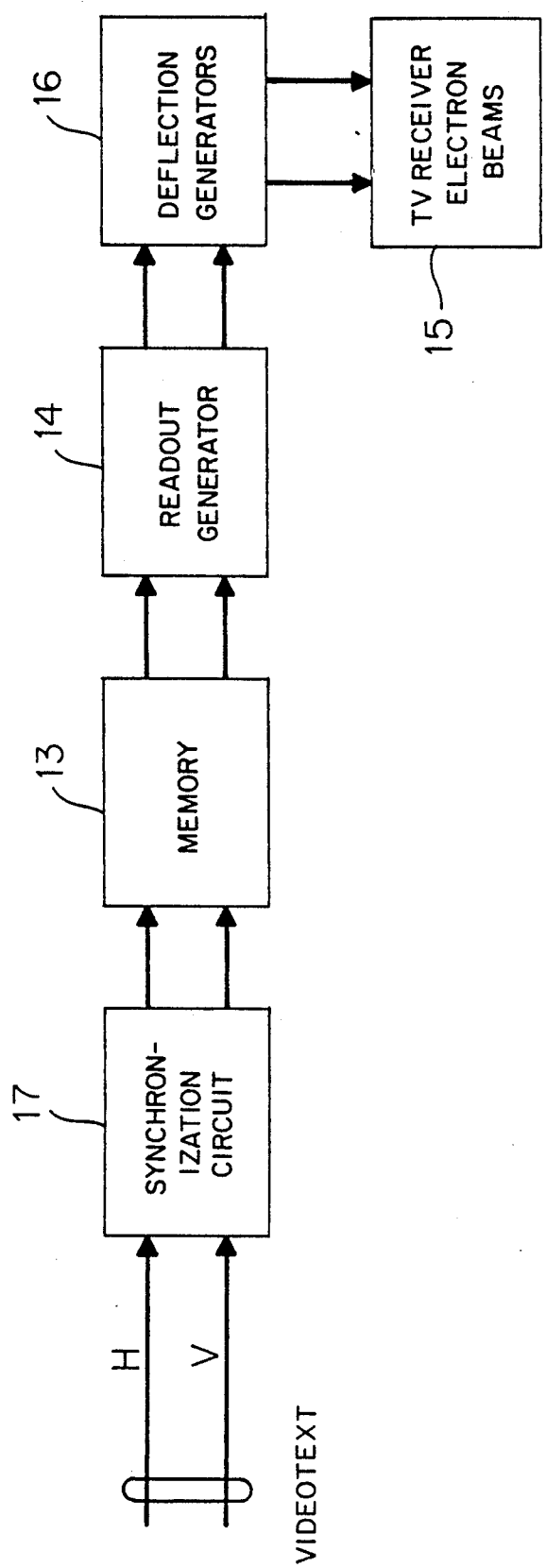
FIG. 2 is a schematic diagram of another embodiment of the arrangement of FIG. 1.

Referring to the drawing, a voltage-controlled oscillator (VCO) 1 operates in PLL (phase locked-loop) mode. The frequency F obtained from the oscillator 1 is divided down to the horizontal frequency $f_H$ with the aid of a frequency divider 2. Synchronizing pulses from television transmitter 12, obtained from the transmitter composite signal after passing through the amplitude separator 3, are compared with the frequency $f_H$ in a phase comparator 4. The phase comparator applies a control voltage to a capacitor 5 of a low-pass filter which controls the oscillator 1.

The drawing illustrates different possibilities in switching the synchronization:

(a) The transmitter composite signal can be interrupted to the amplitude separator 3 with the aid of a switching stage 6 which is controlled by the output of a logical gate 7. The gate 7 has one input connected to a MUTE circuit 8. The second input to the gate 7 is derived from the vertical flyback signal V. The MUTE circuit 8 serves for tone muting control and provides a signal when the television signal that is received is not a normalized signal.

(b) For switching the synchronization, it is also possible to switch off the phase comparator 4. This can be done, for example, by a short-circuit of the horizontal synchronizing pulse H obtained from the amplitude separator 3 and applied to the input of the phase comparator 4. The short circuit state may be carried out with the aid of an electronic switch 9 which is also controlled by the MUTE circuit 8 and the vertical-flyback signal V.

(c) Finally, the time constants of the low-pass filter can be increased by switching a capacitor 10 with a switch 11. The capacitor 10 and the switch 11 are connected in parallel with the capacitor 5.

Video text may be stored in a memory 13 and read out from the memory by a read-out generator 14. The electron beams 15 in the receiver are deflected by deflection generators 16. A synchronization circuit 17 synchronizes the horizontal deflection during the visible component of the reproduced picture, and is switched on only while the reproduced picture is blanked.

We claim:

1. A method of synchronizing horizontal deflection of electron beams in television receivers having a reproduced picture with a visible component, when no transmission signals from a television transmitter are present, comprising the steps of: storing video text in a memory; reading out said video text from said memory by read-out generator means; deflecting said electron beams by deflection generator means; maintaining a predetermined relationship between the frequencies of said deflection generator means and said read-out generator means; switching off a synchronization circuit that synchronizes said horizontal deflection during the visible component of said reproduced picture; and activating said synchronization circuit to display said video text only while said reproduced picture is being blanked.

2. A method as defined in claim 1, wherein a synchronization switchover signal for controlling said switching off step is obtained from a vertical flyback signal corresponding to an invisible part of a television signal and from a mute-control signal emitted by a mute circuit for tone muting-control and providing a signal when the television signal that is received is not a normal operating signal.

3. A method as defined in claim 1, wherein synchronization of said horizontal deflection of electron beams in television receivers is switched off in said switching off step by interrupting a signal path conducting said transmission signals from said television transmitter to an amplitude separator.

4. A method as defined in claim 1, wherein synchronization of said horizontal deflection of electron beams in television receivers is switched off in said switching off step by interrupting a synchronization phase comparison of synchronizing pulses and said transmission signals by switching off a phase comparator between a voltage-controlled oscillator and an amplitude separator receiving said transmission signals from said television transmitter.

5. A method as defined in claim 1, wherein synchronization of said horizontal deflection of electron beams in television receivers is switched off in said switching off step by increasing substantially a phase-comparison time constant of a low-pass filter at the output of a phase comparator connected between a voltage-controlled oscillator and an amplitude separator receiving said transmission signals from said television transmitter; said phase comparator comparing synchronizing pulses with said transmission signals.

6. A method of synchronizing horizontal deflection of electron beams in television receivers having a reproduced picture with a visible component, when no transmission signals from a television transmitter are present, comprising the steps of: switching off a synchronization circuit that synchronizes said horizontal deflection during the visible component of said reproduced picture; activating said synchronization circuit only while said reproduced picture is being blanked; and obtaining a synchronization switchover signal for controlling said switching off step from a vertical flyback signal corresponding to an invisible part of a television signal and from a mute-controlled signal emitted by a mute circuit for tone muting-control and providing a signal when the television signal that is received is not a normal operating signal.

7. A method of synchronizing horizontal deflection of electron beams in television receivers having a reproduced picture with a visible component, when no transmission signals from a television transmitter are present, comprising the steps of: switching off a synchronization circuit that synchronizes said horizontal deflection during the visible component of said reproduced picture; activating said synchronization circuit only while said reproduced picture is being blanked; and switching off synchronization of said horizontal deflection of electron beams in television receivers in said switching off set by interrupting a signal path conducting said transmission signals from said television transmitter to an amplitude separator.

* * * * *